Feb. 6, 1968     C. B. ASKE, JR     3,367,720
VEHICLE WHEEL TRIM
Filed Oct. 22, 1965     3 Sheets-Sheet 1
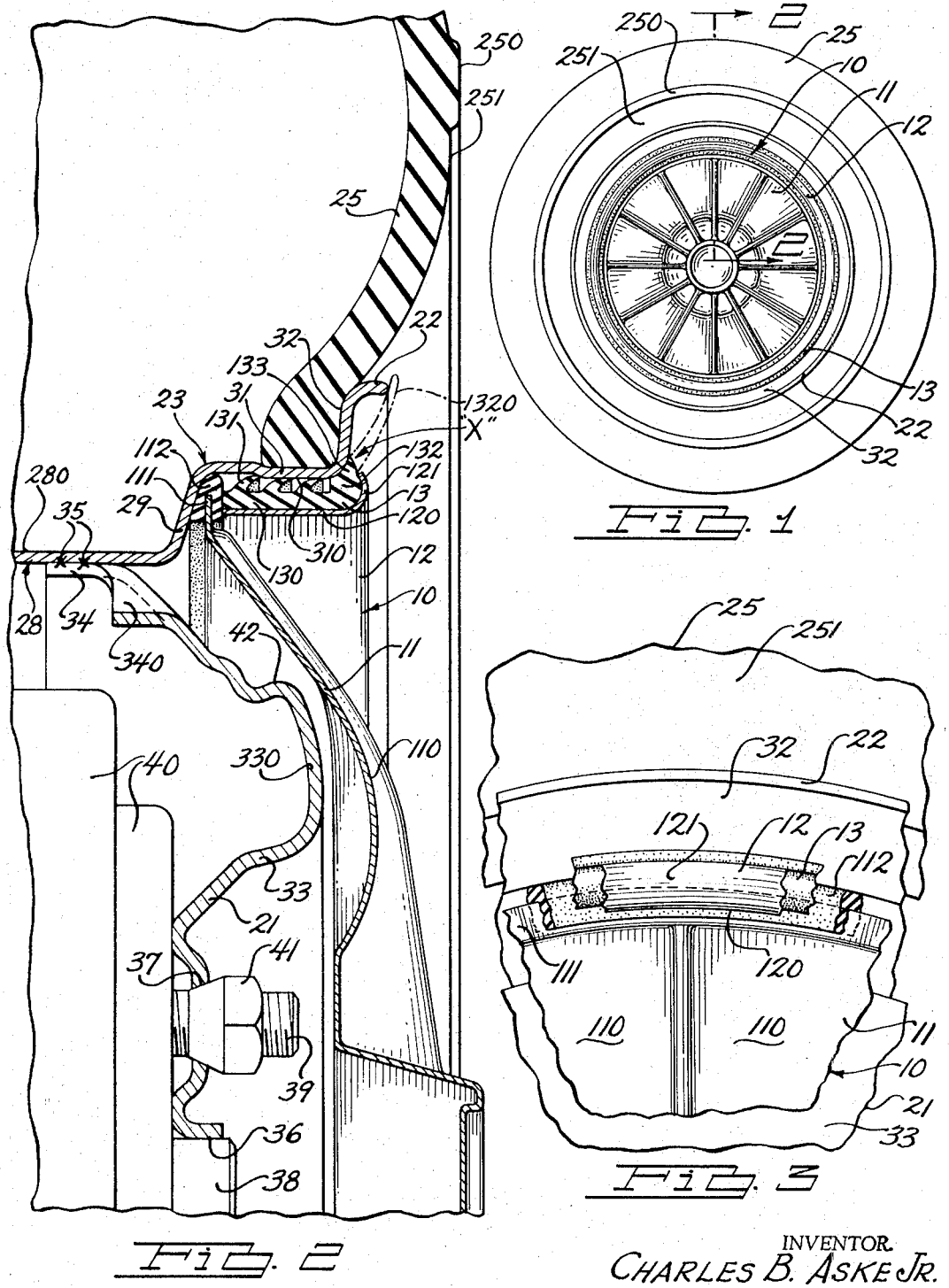
INVENTOR.
CHARLES B. ASKE JR.
BY
Everett G. Wright
ATTORNEY

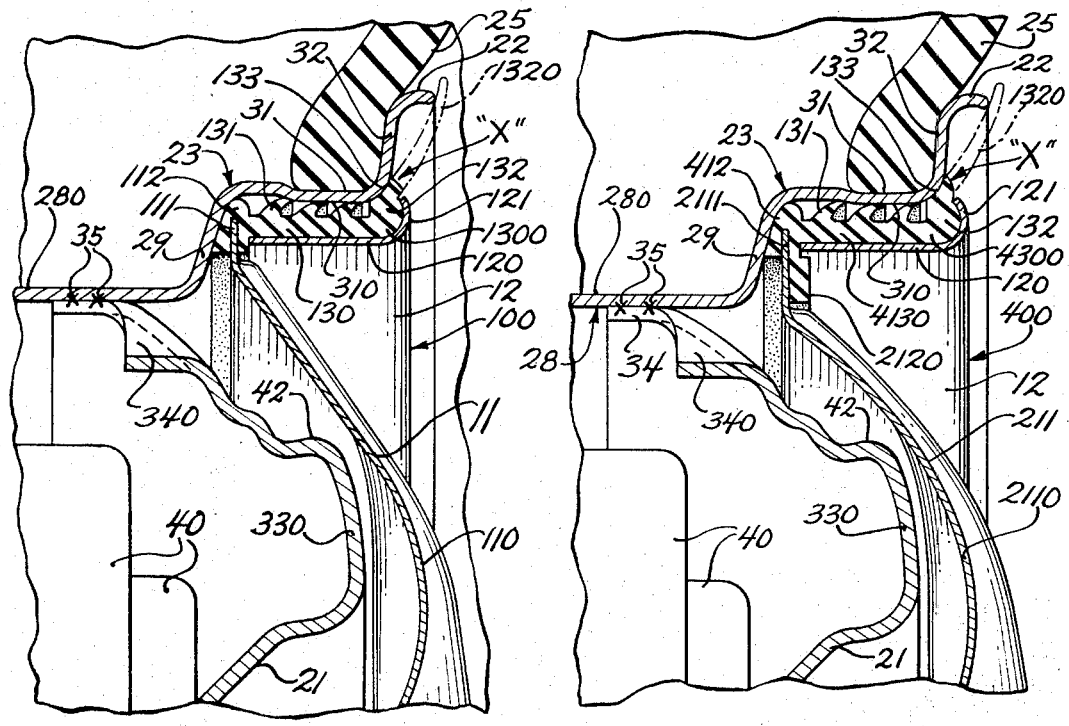

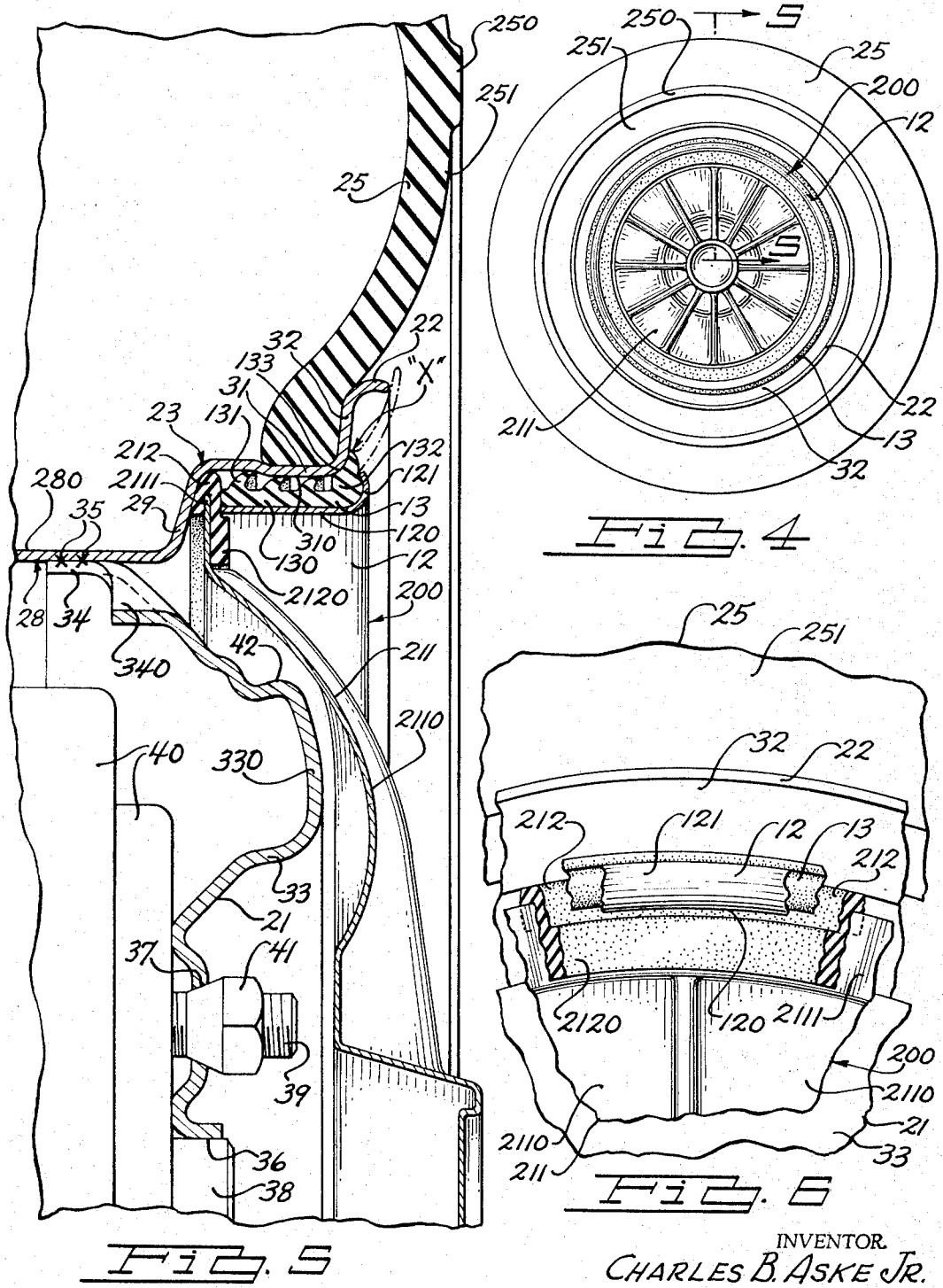

United States Patent Office 3,367,720
Patented Feb. 6, 1968

3,367,720
VEHICLE WHEEL TRIM
Charles B. Aske, Jr., Birmingham, Mich., assignor, by direct and mesne assignments, to Gar Wood Industries, Inc., a corporation of Michigan
Filed Oct. 22, 1965, Ser. No. 502,180
2 Claims. (Cl. 301—37)

ABSTRACT OF THE DISCLOSURE

A vehicle wheel trim for a conventional drop center rim type vehicle wheel consisting of a preferably plastic wheel cover and a preferably metal rim trim wherein the rim trim includes means removably securing the same to a vehicle wheel. The said wheel cover element being positioned concentrically wholly within the tire bead seat annulus of vehicle wheel rim adjacent but spaced in cushioned relationship with respect to the outer side wall of said drop center rim and said tire bead annulus thereof, and is maintained accurately in such position by the rim trim element and its securing which covers the remaining portion of said tire bead seat annulus; the said wheel cover and rim trim elements providing in effect a unitary whole when mounted on said vehicle wheel, and are completely cushioned therefrom.

---

This invention relates to improvements in vehicle wheel trim, and in particular to extremely economical wheel cover and rim trim of the type that may be readily and firmly mounted on a vehicle wheel, and conveniently removed therefrom without damage to the wheel cover and rim trim elements or to the finish of the vehicle wheel.

The primary object of the instant invention is to provide an improved wheel trim for automotive vehicle wheels employing an assembly of economical to manufacture parts that may be easily and readily mounted on a vehicle wheel as a complete assembly, or, which may be mounted on a vehicle wheel as a plurality of sub-assemblies, or as a sub-assembly and an added element, forming, when mounted on said vehicle wheel, the equivalent of a unitary structure both in function and appearance.

A further object of the invention is to provide a simply constructed, readily assembled and effective means for trimming the spider and hub of a conventional motor vehicle wheel extending at least over and trimming the wheel rim annulus of said vehicle wheel, the said wheel trim preferably being of an economically formed plastic or other suitable material capable of withstanding forces applied to it during assembly and mounting on the vehicle wheel, the said rim trim at the wheel rim annulus being of light preferably formed stainless steel, and resilient cushioning means maintaining said wheel and rim trim elements in assembled relationship on a vehicle wheel in a manner to avoid excess stress thereon from thermal expansion and contraction as well as from road shocks and normal wheel deflections occurring during assembly, mounting and use of the wheel trim means on a vehicle wheel.

Still another object of the invention is to provide an extremely lightweight vehicle wheel rim consisting of an extremely lightweight wheel cover and rim trim completely cushioned from the vehicle wheel and yet anchored thereto in a manner to eliminate the usual wheel cover noises and ratcheting with respect to the vehicle wheel, which compensates for reasonable dimensional inequalities in vehicle wheel construction, and which admit of high differentials in expansion and contraction of the wheel cover, wheel rim trim and the vehicle wheel, all at at an extremely low cost and capable of being produced economically in a wide range of interchangeable aesthetic designs.

Other objects of the invention will become apparent by reference to the following detailed description taken in connection with the accompanying drawings, in which:

FIG. 1 is a side elevational view of a vehicle wheel and tire having mounted thereon a combined vehicle wheel cover and rim trim embodying the invention.

FIG. 2 is an enlarged fragmentary sectional view taken on the line 2—2 of FIG. 1.

FIG. 3 is an enlarged fragmentary elevational view with parts broken away showing the wheel cover and rim trim disclosed in FIGS. 1 and 2.

FIG. 4 is a side elevational view of a vehicle wheel and tire having mounted thereon an alternate embodiment of a combined wheel cover and rim trim of the invention.

FIG. 5 is an enlarged fragmentary sectional view taken on the line 5—5 of FIG. 4.

FIG. 6 is an enlarged fragmentary elevational view with parts broken away showing the wheel cover and rim trim disclosed in FIGS. 4 and 5.

FIG. 2-A and 5-A are enlarged fragmentary sectional views similar to FIGS. 2 and 5 respectively each showing how the embodiments of FIGS. 1, 2 and 3 and FIGS. 4, 5 and 6 respectively may be constructed as three piece rather than four piece assemblies.

Referring now to the drawings wherein like reference characters refer to like and corresponding parts throughout the several views, the particular embodiment of the invention disclosed in FIGS. 1, 2 and 3 comprises a combined wheel cover and wheel trim assembly 10 consisting of a wheel cover element 11, a rim trim element 12 and an anchorage element 13, the said wheel cover 11, rim trim 12 and anchorage element 13 being juxtaposed and interengaged to provide, in combination with the vehicle wheel, a completely rubber cushioned wheel cover and rim trim construction that is easily and positively mounted on a vehicle wheel.

The vehicle wheel 21 is of a conventional type and is shown in the drawings with a tubeless tire 25 mounted thereon. The said vehicle wheel 21 has the usual drop center rim 23 composed of a central channel or drop center 28 having side walls 29 and a base 280. An annular tire bead seat 31 extends laterally outwardly from each side of the side walls 29 of the drop center 28. Each said tire bead seat 31 terminates in a tire bead seat flange 32 extending radially therfrom and which is axially outwardly curved at its upper portion to form an axially disposed outer lip 22. The said tire bead seat flange 32 is ofttimes referred to as the wheel flange and the said lip 22 is ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is usually formed with an annular axially outwardly extending reinforcing collar 330 which is generally provided with a plurality of hub cap retainer nubs 42 over which a conventional hub cap (not shown) is normally sprung for securement onto the vehicle wheel 21. However, because the wheel trim assembly of the invention covers substantially the entire wheel, no hub cap is used when a vehicle wheel is trimmed with wheel trim of the instant invention. The vehicle wheel manufacturer nevertheless paints the vehicle wheels 21 in a conventional manner so that the purchaser of the motor vehicle may have a choice of available wheel trim.

The particular tire 25 illustrated in the drawings is a modern tubeless tire having a scuff bead 250 extending from its side wall 251. The said tubeless tire 25, when used on the vehicle wheel 21, requires a conventional valve stem (not shown) mounted in sealed relationship through a suitable valve stem aperture (not shown) generally provided in the outer side wall 29 of the drop center rim channel 28 of the rim 23 of the said wheel 21. The wheel trim 10 of the invention is also suitably slotted or apertured (not shown) to accommodate the said valve stem so that it is always available for inflation or deflation of the tire.

In the embodiment of the invention disclosed in FIGS. 1–3 inclusive, the combined wheel cover and wheel trim assembly 10 consists of three elements; namely a generally disc or dome shaped relatively rigid wheel cover element 11, a generally axially disposed annular rim trim element 12, and a generally axially disposed annular toothed anchorage element 13.

The wheel cover element 11 is preferably formed or molded of a relatively rigid yet not brittle plastic and includes an axially outwardly facing central disc or domed portion 110 suitably contoured to avoid contact with the wheel spider 33 and a circumferential radially extending flange 111. The said circumferential flange 111 radially extending from the said disc or domed portion 110 of the wheel cover 11 is preferably relatively thin; for example, preferably the same thickness as the said disc or domed portion 110. This permits the wheel cover element 11 to be vacuum or injection molded and made much thinner and lighter, and more economical than if the said wheel cover element were thicker. Furthermore, in addition to the economies present in the use of a much thinner plastic wheel cover element 11, many aesthetic shapes may be employed such as plain bubbles, wavy formations, and simulated spoked elements employing either transparent, partially opaque, flecked or fully opaque plastic whereby to give the automotive stylist a greater range of selection of materials, colors and shapes than heretofore was available to him.

The outer peripheral portion of the circumferential radially extending flange 111 of the wheel cover element 11 is provided with a radially compressible preferably continuous slotted mounting flange 112 of rubber or the like thereover which conforms to the tire bead seat annulus 310 of the vehicle wheel rim 23 and becomes disposed against the side wall 29 of the rim channel 28 when the said wheel cover element 11 is mounted on a vehicle wheel by pressing it axially within the said tire bead seat annulus 310.

When the said wheel cover element 11 is axially placed on the vehicle wheel 21, it remains in concentric position within the tire bead seat annulus 310 of the wheel rim 21 with its mounting flange 112 disposed against the side wall 29 of the wheel channel 28, where it is axially anchored by the axially disposed rim trim element 12 and its anchorage element 13 as hereinafter described.

The annular rim trim element 12 consists of an annular axially disposed band or ring portion 120 preferably of stainless steel; however, it may be formed of cold rolled steel suitably painted or otherwise finished, or it could be of plastic or polished or anodized aluminum. The band or ring portion 120 of the annular rim trim element terminates in a radially disposed annular outer portion 121 which is preferably curved or bull-nosed to conform to the axially facing bead portion 132 of the anchorage element 13 which is hereinafter described in detail. Although the said annular rim trim element 12 is shown in the drawings as having a smooth surface, it may be suitably ribbed or otherwise patterned to provide aesthetic effects and a multiplicity of reflective surfaces to provide additional eye appeal.

The annular anchorage element 13 is preferably formed of a rubber or synthetic rubber extrusion which is cut to the proper length and vulcanized or otherwise secured together into an annulus or ring, or, it may be molded to the desired shape. The said annular anchorage element 13 consists of a base portion 130 having a plurality, preferably three, axially spaced circumferential relatively thin integrally formed outwardly disposed flexible anchorage teeth 131, and an axially and outwardly disposed annular bead portion 132 formed with an arcuate seat at 133 to seat against the juncture of the annular tire bead seat 31 and the tire bead seat flange 32 of the drop center rim 23 of the vehicle wheel 21 when the wheel cover and wheel trim assembly 10 is mounted thereon as best shown in FIG. 2. The annular bead portion 132 of the anchorage element 13 may be provided integrally or otherwise with a suitable annular generally radially disposed extension as indicated by the dot and dash lines 1320 in FIG. 2 to provide a trim extending from the bull nose portion 121 of the rim trim element 12 over the lip 22 of the wheel rim 23. The anchorage element 13 and/or its extended annular portion 1320 may be black or of any other selected color.

With the wheel cover element 11 axially positioned on the vehicle wheel 21 within the tire bead seat annulus 310 thereof and with its resilient mounting flange 112 disposed frictionally within the tire bead seat annulus 310 of the vehicle wheel 21 and against the side wall 29 of the wheel rim channel 28, the rim trim and anchorage elements 12 and 13 which has been preassembled are then axially mounted within the tire bead seat annulus 310 of the vehicle wheel 21 with the axial inner edges of the said rim trim element 12 and anchorage element 13 in firm juxtaposition with and against the said mounting flange 112 of the wheel cover element 11. Thus, the wheel cover element 11 and the rim trim element 12 are removably but firmly and concentrically anchored by the anchorage element 13 on the vehicle wheel 21 in an effective unitary whole.

It will be noted that the anchorage teeth 131 of the anchorage element 13 flex axially outwardly as best shown in FIG. 2 providing the easy mounting but firm anchorage of the wheel trim assembly 10 on the vehicle wheel 21. To remove the vehicle wheel trim assembly 10 from the vehicle wheel 21, a gentle but firm prying of the wheel trim assembly progressive at intervals therearound is all that is required. This is accomplished by placing a screwdriver or other blunt prying device at "X" between the axially outer annular bead 132 of the annular anchorage element 13 and the juncture of the tire bead seat 31 and the tire bead seat 32 of the drop center rim, and then prying axially outwardly.

Inasmuch as the total weight of the entire wheel cover and tire trim assembly 10 is extremely light, the anchorage teeth 131 of the anchorage element 13 may be relatively thin and flexible providing ease in mounting rim trim 12 and its anchorage element 13 within the tire bead seat annulus 310 of the rim 23 of a vehicle wheel 21 in firm juxtaposition against the wheel cover element 11 which just previously had been mounted concentrically within the said tire bead seat annulus 310 against the tire bead seat flange 32 of the said wheel rim 23. And further, since the circumferential anchorage teeth 131 must first flex from an axial outward position to an axial inward position before removal of the wheel trim assembly 10 from a vehicle wheel 21, the anchorage and rim trim elements 11 and 12 of the said wheel trim assembly 10 will remain properly mounted on the vehicle wheel 21 and positively hold the wheel cover element 11 thereof in its desired cushioned position thereon. Thusly, the complete wheel cover and tire trim assembly 10 will remain firmly mounted on the vehicle wheel 21 withstanding road shocks and rim deflections normally encountered in driving a vehicle over rough roads and around turns at relatively high speeds.

The embodiment of the invention disclosed in FIG. 2–A is like and similar to the embodiment of the invention disclosed in FIGS. 1–3 inclusive, except that is the combined wheel cover and wheel trim assembly 100 shown therein, the compressible mounting flange 112 of the wheel cover element 11 is formed integral with the base portion 130 of the anchorage element 1300 which is otherwise like and similar to the anchorage element 13 hereinbefore described in detail. Accordingly, the wheel cover element 11, the rim trim element 12 and the anchorage element 1300 must be preassembled as a unitary vehicle wheel cover and wheel trim assembly 100, and then mounted as a unit on a wheel 21 by manually telescoping the said assembly 100 to refusal within the tire bead seat annulus 310 of the wheel rim 23 with the mounting flange 112 disposed against the side wall 29 of the rim channel 28 and with the arcuate seat 133 of the bead portion 132 of the anchorage element 1300 seated at the juncture of the annular tire bead seat 31 and the tire bead seat flange 32 of the said wheel rim 23.

The embodiment of the invention disclosed in FIGS. 4, 5 and 6 is like and similar to the embodiment of the invention disclosed in FIGS. 1, 2 and 3 except that the combined wheel cover and wheel trim assembly 200 shown therein employs a wheel cover element 211 rather than the wheel cover element 11. The said wheel cover element 211 has a domed portion 2110 and a circumferential radially extending flange 2111. The said circumferential flange 2111 is considerably wider than the circumferential flange 111 of the wheel cover element 11 of the embodiment of the invention shown in FIGS. 4, 5 and 6 to accommodate an ornamental annular axially outwardly facing band or annulus 2120 extending radially inwardly from the axially disposed outer portion of the radially compressible mounting flange 212 which is formed of a color contrasting with the selected color of the wheel cover element 211. This construction provides with a great simplicity an annulus 2120 of a color contrasting to the selected color of the wheel cover element 211. Obviously, the color of the anchorage element 13 of the embodiment of the invention disclosed in FIGS. 4, 5 and 6 preferably may be the same color as that of the compressible mounting flange 212 and its annulus 2120 so that the bead portion 132 thereof also would contrast with the selected color of the wheel cover element 211 and/or the color of the motor vehicle on the wheels of which the wheel trim assembly 200 would be mounted. This provides automotive stylists with additional very inexpensive means for providing a multi-stripe effect in further ornamentation of vehicle wheels with a minimum of expense.

By reference to FIG. 5–A, it will be observed that the combined wheel cover and wheel trim assembly 400 may have its compressible mounting flange 412 formed integral with the base portion 4130 of the anchorage element 4300 which is otherwise like and similar to the anchorage element 1300 of the embodiment of the invention shown in FIG. 2–A. It is obvious that the wheel cover element 211, the rim trim element 12 and the anchorage element 4300 thereof must be preassembled as a unitary wheel cover and wheel trim assembly 400, and then mounted as a unit on a wheel 21 by manually telescoping the said unitary assembly 400 to refusal within the tire bead seat annulus 310 of the wheel rim 23 and with the arcuate seat 133 of the annular bead portion 132 of the anchorage element 4300 seated at the juncture of the tire bead seat 31 of the tire bead seat flange 32 of the said wheel rim 23. Otherwise than pointed out above, the embodiment of the invention disclosed in FIG. 5–A is like and similar to the embodiment of the invention disclosed in FIGS. 4, 5 and 6.

With the improved vehicle wheel trim disclosed herein, a highly desirable wheel and tire trim construction is made available to the automotive industry providing great flexibility in application of selected wheel trim elements to vehicle wheels, all at an extremely low cost and at the same time with practicability of interchangeable elements to give the automobile manufacturer, the dealer and the motorist a selection of wheel trim wherein several basic elements may be selected and arranged to provide the desired effect. Furthermore, the instant invention provides complete wheel cover cushioning, and proper allowance for expansion and contraction of all wheel trim elements with respect to each other and the wheel upon which wheel trim is mounted.

Although but several embodiments of the invention have been disclosed herein, it is obvious that many changes may be made in the size, shape, arrangement of elements of the invention, all without departing from the spirit and scope thereof as defined in the appended claims.

I claim:

1. In a vehicle wheel trim for vehicle wheels of the type including a wheel spider and an annular drop center rim formed with a central annular drop center channel element including a base fixed on the periphery of said wheel spider and a generally axially disposed outer side wall flange, a radially disposed tire bead seat forming a tire bead seat annulus extending axially outwardly from said channel side wall flange to a radially disposed tire bead seat flange terminating in an axially outwardly disposed annular lip, said vehicle wheel trim comprising
    a wheel cover and rim trim assembly consisting of
        a wheel cover element having a radially outwardly disposed circumferential flange and a central generally domed portion formed in a selected aesthetic design disposed in axial spaced relationship over said wheel spider and the axially outer side wall flange of said drop center rim channel element, and
        a combined annular rim trim element and resilient rubber anchorage means wherein the resilient rubber anchorage means is telescoped over said rim trim element and has an integral portion extending axially inwardly of said annular metal rim trim element with a radially inwardly disposed slot therearound into which said radially outwardly disposed circumferential flange of said wheel cover element is disposed,
    said wheel cover and rim trim assembly being telescoped within and resiliently engaging said tire bead seat annulus with said resilient rubber anchorage means axially removably holding said vehicle wheel cover and rim trim assembly as a unit on said vehicle wheel within said tire bead seat annulus with the axially inner extension of said resilient rubber anchorage means disposed in firm contact against the outer side wall flange of the drop center channel element and the tire bead seat annulus of said vehicle wheel.

2. A vehicle wheel trim as claimed in claim 1 wherein the axially inward extension of said resilient rubber anchorage means is provided with a radially inwardly extending band serving as an ornamentation between the dome of said wheel cover element and said wheel trim.

References Cited

UNITED STATES PATENTS

| 2,736,610 | 2/1956 | Waite | 301—37 |
| 2,812,215 | 11/1957 | Waite | 301—37 |
| 2,996,335 | 8/1961 | Aske | 301—37 |
| 3,048,445 | 8/1962 | Shoemaker | 301—37 |
| 3,078,125 | 2/1963 | Aske | 301—37 |
| 3,265,441 | 8/1966 | Baldwin | 301—37 |

RICHARD J. JOHNSON, *Primary Examiner.*

BENJAMIN HERSH, *Examiner.*